US 8,310,346 B2

(12) United States Patent
Burbridge et al.

(10) Patent No.: US 8,310,346 B2
(45) Date of Patent: Nov. 13, 2012

(54) VERIFICATION OF MOVEMENT OF ITEMS (75) Inventors: Trevor Burbridge, Ipswich (GB);
Andrea Soppera, Ipswich (GB)

(73) Assignee: British Telecommunications public limited company, London (GB)

( * ) Notice: Subject to any disclaimer, the term of this patent is extended or adjusted under 35 U.S.C. 154(b) by 404 days.

(21) Appl. No.: 12/531,143

(22) PCT Filed: Mar. 11, 2008

(86) PCT No.: PCT/GB2008/000849
§ 371 (c)(1),
(2), (4) Date: Oct. 21, 2009

(87) PCT Pub. No.: WO2008/110791
PCT Pub. Date: Sep. 18, 2008

(65) Prior Publication Data
US 2010/0109851 A1 May 6, 2010

(30) Foreign Application Priority Data
Mar. 14, 2007 (GB) .................................. 0704963.8

(51) Int. Cl.
*H04Q 5/22* (2006.01)
*G05B 19/00* (2006.01)
*G08B 13/14* (2006.01)
*H04L 9/08* (2006.01)

(52) U.S. Cl. .................... 340/10.42; 340/5.26; 340/10.1; 340/572.1; 340/572.8; 380/282; 713/155

(58) Field of Classification Search .............. 340/5.92, 340/10.1, 10.42, 572.1, 572.4, 572.7, 572.8, 340/825.32; 235/375, 383, 385, 440; 700/30; 705/1, 75; 380/270, 282; 713/155, 162, 172, 176, 180
See application file for complete search history.

(56) References Cited

U.S. PATENT DOCUMENTS
8,024,579 B2 * 9/2011 Challener et al. ............. 713/187
8,037,294 B2 * 10/2011 Nochta ......................... 713/150
(Continued)

FOREIGN PATENT DOCUMENTS
CA 2556843 2/2007
(Continued)

OTHER PUBLICATIONS
U.S. Appl. No. 12/531,137, Soppera et al, filed Sep. 14, 2009.
(Continued)

*Primary Examiner* — Daniel Wu
*Assistant Examiner* — Mancil Littlejohn
(74) *Attorney, Agent, or Firm* — Nixon & Vanderhye P.C.

(57) ABSTRACT

Apparatus and system for verifying a route taken during movement of an RFID tag, comprising a trusted platform module; sealed storage (80) comprising one or more stores (50, 52) for storing a public key (64), a private key (68) and a policy (62); and processors arranged to: receive data (60) read-out from the RFID tag (4) and comprising an RFID tag identity and an encrypted signature (9); use the public key (64) to decrypt the encrypted signature (9); verify that the decrypted signature (9) corresponds to a first entity from which, according to the policy (62), a second entity is authorised to receive the given RFID tag (4); use the private key (68) to provide an encrypted signature (9); and forward data comprising the encrypted signature (9) to an RFID tag writer (22).

16 Claims, 7 Drawing Sheets

U.S. PATENT DOCUMENTS

| | | |
|---|---|---|
| 2005/0049979 A1 | 3/2005 | Collins et al. |
| 2005/0251857 A1* | 11/2005 | Schunter et al. ............... 726/16 |
| 2007/0017987 A1 | 1/2007 | Lapstun et al. |
| 2007/0112574 A1 | 5/2007 | Greene |
| 2007/0126578 A1 | 6/2007 | Broussard |

FOREIGN PATENT DOCUMENTS

| | | |
|---|---|---|
| CN | 1776721 | 5/2006 |
| JP | 2006/273511 | 10/2006 |
| WO | 2006/057390 | 6/2006 |
| WO | WO 2006/057390 | 6/2006 |
| WO | 2008/110786 A2 | 9/2008 |
| WO | 2008/110786 A3 | 9/2008 |
| WO | WO 2008/110791 A3 | 9/2008 |

OTHER PUBLICATIONS

UK Search Report dated Jul. 27, 2007 in GB0704963.8.

EPCGlobal: "Pedigree Ratified Standard, version 1.0" [online], Jan. 5, 2007, XP002505081.

International Search Report mailed Dec. 9, 2008 in PCT/GB2008/000841.

UK Search Report dated Jul. 16, 2007 in GB0704900.0.

Landt, Jerry (2001), "Shrouds of Time: The History of RFID," AIM, Inc.

International Search Report for PCT/GB2008/000849 mailed Dec. 9, 2008 (3 pages).

* cited by examiner

VERIFICATION OF MOVEMENT OF ITEMS

This application is the U.S. national phase of International Application No. PCT/GB2008/000849 filed 11 Mar. 2008 which designated the U.S. and claims priority to British Patent Application No. 0704963.8 filed 14 Mar. 2007, the entire contents of each of which are hereby incorporated by reference.

BACKGROUND AND SUMMARY

The present invention relates to processing, for example monitoring, verifying, securing, and so on, movement of items along a route, e.g. a supply chain, between different entities. The present invention also relates to apparatus for implementing such processing. The present invention relates in particular, but not exclusively, to securing or verifying a route of an RFID (radio frequency identification) tag attached to an item of interest.

Processes are known for verifying movement of an item between different entities. For example, there is a commercial and safety requirement for a supply chain of branded goods, in particular pharmaceutical products, to be verified to avoid counterfeit products being introduced into an authorised supply chain.

RFID tags are well known. RFID tags are circuits in the form of label-like items that can be read (and sometimes also written on) by reader (and writer) units communicating with the tags at RF frequencies. Further details of RFID tag technology can found in, for example, Landt, Jerry (2001), "Shrouds of Time: The history of RFID", AIM, Inc.

It is known to attach RFID tags, written with batch or unique codes, to items, and to monitor received items for authenticity by reading the RFID tag attached thereto. Conventionally, read-out data is sent to remote parties for comparison with stored data of valid items.

It is known to establish an electronic pedigree (also called an e-pedigree). An e-pedigree provides a record of data such as arrival and departure times of specific items, e.g. during manufacture, shipping and so on. An entity in a supply chain or other route receiving an item can access e-pedigree to evaluate the item's authenticity. A proposed standardised e-pedigree approach using RFID technology is known as EPCglobal, further details of which van be found at, for example, www.epcglobalinc.org or from GS1 US, Princeton Pike Corporate Center, 1009 Lenox Drive, Suite 202, N.J. 08648 Lawrenceville.

EPCglobal has proposed an architecture where each tag is given a 96-bit unique code and where each entity in the supply chain can publish information about the product through a so-called EPC information service. An EPC information service is a database that provides a standardized query interface. To enable the end-to-end visibility of information across different entities, two approaches are suggested. One approach is to replicate or "push" fragments of e-pedigree information into a database operated by a trusted third party. Entities would use an EPC information service interface to this database to access and validate e-pedigree information. A second approach is to operate a so-called discovery service that references distributed EPC information services operated by individual supply chain participants. The entity would use the discovery service to identify the location of fragments of e-pedigree information and retrieve them from different EPC information services.

Referring to prior patent publications, International application WO 2006/057390 ("NEC") relates to a distribution channel authenticating system intended to enable detection of counterfeiting and false alteration of distribution channel information by a false third party.

United States application US 2007/112574 ("Greene") relates to systems, methods and software programs intended to provide software intelligence to RFID tags.

Japanese application JP 2006-273511 ("NEC") appears to relate to a portable reader reading an RFID tag on goods delivered by courier to a customer, and at the same time reading an ID from the customer location to validate delivery.

Chinese application CN 1776721 ("Peng Feng") discloses a system for validating the truthfulness of goods. The system is said to be composed only of an unscrambler and a tag. Manufacturers are able to prepare and configure tags using their own digital signature and purchasers are then said to be able to verify the truthfulness of goods easily and reliably.

United States application US 2005/049979 ("Collins et al") relates to a method, apparatus and system for determining a fraudulent item. Anti-forgery RFID tags are utilised with additional measures to thwart would-be forgers. Each anti-forgery RFID tag comprises a unique or semi-unique number that, along with a private key possessed only by the legitimate product manufacturer, determines a signature that is preferably printed on the product packaging. Utilising the number on the anti-forgery RFID tag and a public key corresponding to the private key, the signature may be verified by standard public-key cryptographic methods. The validation of the signature identifies the product's authenticity.

The present inventors have realised that approaches such as e-pedigree, and particularly when involving approaches such as use of a discovery service, exhibit a disadvantage that different entities in a route, e.g. a supply chain, are required to divulge information that may otherwise be confidential. Furthermore, the present inventors have realised that ongoing verification requires ongoing querying of remote centralised information resources, hence there is a potential for large levels of disruption of service when a centralised resource is unavailable.

In a first aspect the present invention provides a verification apparatus for use in verification of a route taken during movement of an RFID tag, the verification apparatus comprising: a trusted platform module; sealed storage comprising a store for storing a private key; and one or more processors arranged to: (i) use the private key to provide, for the given RFID tag identity, an encrypted signature; and (ii) forward data comprising the encrypted signature to an RFID tag writer for writing to the RFID tag.

The apparatus may further comprise: one or more stores for storing a public key and a policy; and the one or more processors may be further arranged to: (i) receive, from an RFID tag reader, data read-out from the RFID tag and comprising an RFID tag identity and an encrypted signature; (ii) use the public key to decrypt the encrypted signature from the data read-out from the RFID tag; and (iii) verify that the decrypted signature corresponds to a first entity from which, according to the policy, a second entity associated with the verification apparatus is authorised to receive an RFID tag with the given RFID tag identity.

The sealed storage may further comprise one or more of the stores for storing a public key and a policy.

In a second aspect the present invention provides a verification apparatus for use in verification of a route taken during movement of an RFID tag, the verification apparatus comprising: a trusted platform module; sealed storage comprising one or more stores for storing a public key and a policy; and one or more processors arranged to: (i) receive, from an RFID tag reader, data read-out from the RFID tag and comprising an RFID tag identity and an encrypted signature; (ii) use the public key to decrypt the encrypted signature from the data read-out from the RFID tag; and (iii) verify that the decrypted signature corresponds to a first entity from which, according to the policy, a second entity associated with the verification apparatus is authorised to receive an RFID tag with the given RFID tag identity.

The apparatus may further comprise: a store for storing a private key; and the one or more processors may be further arranged to: (i) use the private key to provide, for the given RFID tag identity, an encrypted signature; and (ii) forward data comprising the encrypted signature to an RFID tag writer for writing to the RFID tag.

The sealed storage may further comprise the store for storing a private key.

Apparatus according to any of the above described aspects may further comprise the RFID tag reader and the RFID tag writer.

Apparatus according to any of the above described aspects may be arranged to allow remote attestation by a third party.

Apparatus according to any of the above described aspects may be further arranged to report the verification to one or more third parties.

In apparatus according to any of the above described aspects, the one or more processors may be further arranged to raise an alarm responsive to the verifying step determining that the decrypted signature does not correspond to an entity from which the second entity is authorised to receive an RFID tag with the given RFID tag identity.

In the apparatus a third party to which verification is reported and a third party by whom remote attestation is allowed may be identical.

In a further aspect the present invention provides a system for verifying a route taken during movement of an RFID tag, the system comprising: a first verification apparatus according to the above described first aspect; and a second verification apparatus according to the above described second aspect.

The system may further comprise a controller apparatus.

The controller apparatus may be arranged to provide one or more of a public key, a private key and a policy to one or more of the verification apparatus of the system.

The controller apparatus may be arranged to perform remote attestation of one or more of the verification apparatus of the system.

Thus aspects of the present invention provide a verification process or system which is relatively resilient and has low vulnerability to single point failure. Only a low level of information needs to be exchanged between adjacent entities in a supply chain. Moreover, no information needs to be shared between non-adjacent entities. The invention may be implemented using standard RFID tag technology.

Various other advantages provided by aspects of the invention are outlined in the following description of embodiments of the invention.

BRIEF DESCRIPTION OF THE DRAWINGS

Embodiments of the invention will now be described, by way of example only, with reference to the accompanying drawings, in which.

DETAILED DESCRIPTION OF PRESENT EXAMPLE EMBODIMENTS

Figure 1:
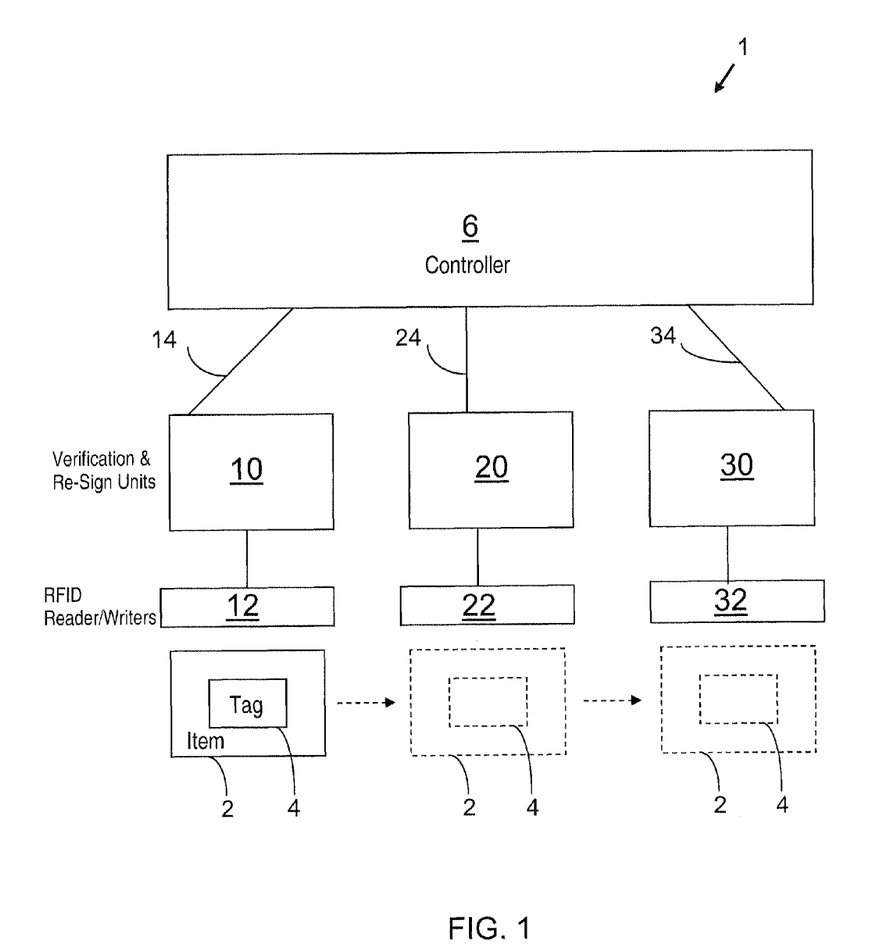
FIG. 1 is a schematic illustration in block diagram form of a first embodiment of a supply chain verification system 1.

FIG. 1 is a schematic illustration in block diagram form of a first embodiment of a supply chain verification system 1. In this embodiment, an authorised supply chain comprises three entities, namely a first entity, a second entity and a third entity. The first entity is authorised to pass a specific item 2 to the second entity. The second entity is authorised to receive the item 2 from the first entity. The second entity is also authorised to pass the item 2 to the third entity. The third entity is authorised to receive the item 2 from the second entity. The item 2 has a re-writable RFID tag 4 attached to it.

The supply chain verification system 1 of this embodiment comprises a supply chain controller 6, and three verification and re-sign units, namely a first verification and re-sign unit 10, a second verification and re-sign unit 20, and a third verification and re-sign unit 30. The first verification and re-sign unit 10 is located at, and controlled by, the first entity. The second verification and re-sign unit 20 is located at, and controlled by, the second entity. The third verification and re-sign unit 30 is located at, and controlled by, the third entity.

Each verification and re-sign unit 10, 20, 30 is coupled to a respective RFID reader-writer (i.e. a device that is able to read out the information on the RFID tag 4 and also rewrite new information to the RFID tag 4). In more detail, the first verification and re-sign unit 10 is coupled to a first RFID reader-writer 12; the second verification and re-sign unit 20 is coupled to a second RFID reader-writer 22; and the third verification and re-sign unit 30 is coupled to a third RFID reader-writer 32. Each respective RFID reader-writer 12, 22, 32 is located at the entity where the respective verification and re-sign unit 10, 20, 30 is located.

The first verification and re-sign unit 10 is coupled to the supply chain controller 6 by a first communications link 14. The second verification and re-sign unit 20 is coupled to the supply chain controller 6 by a second communications link 24. The third verification and re-sign unit 30 is coupled to the supply chain controller 6 by a third communications link 34. As will be explained in more detail below, the communications links 14, 24, 34 do not need to be continually available for typical ongoing operation of the system 1.

As will be explained in more detail below, when the item 2 is passed down the supply chain from entity to entity, at each entity the RFID tag 4 attached to the item 2 is read and/or written by that entity's RFID reader-writer according to processing carried out by that entity's verification and re-sign unit 10, 20, 30. The movement of the item 2 down the supply chain, and the processing of the item by the respective verification and re-sign unit's along the chain, is represented schematically in FIG. 1 by the dotted line arrows and dotted line representations of the item 2 with RFID tag 4 positioned at the respective verification and re-sign units as it is passed physically down the supply chain.

Figure 2:
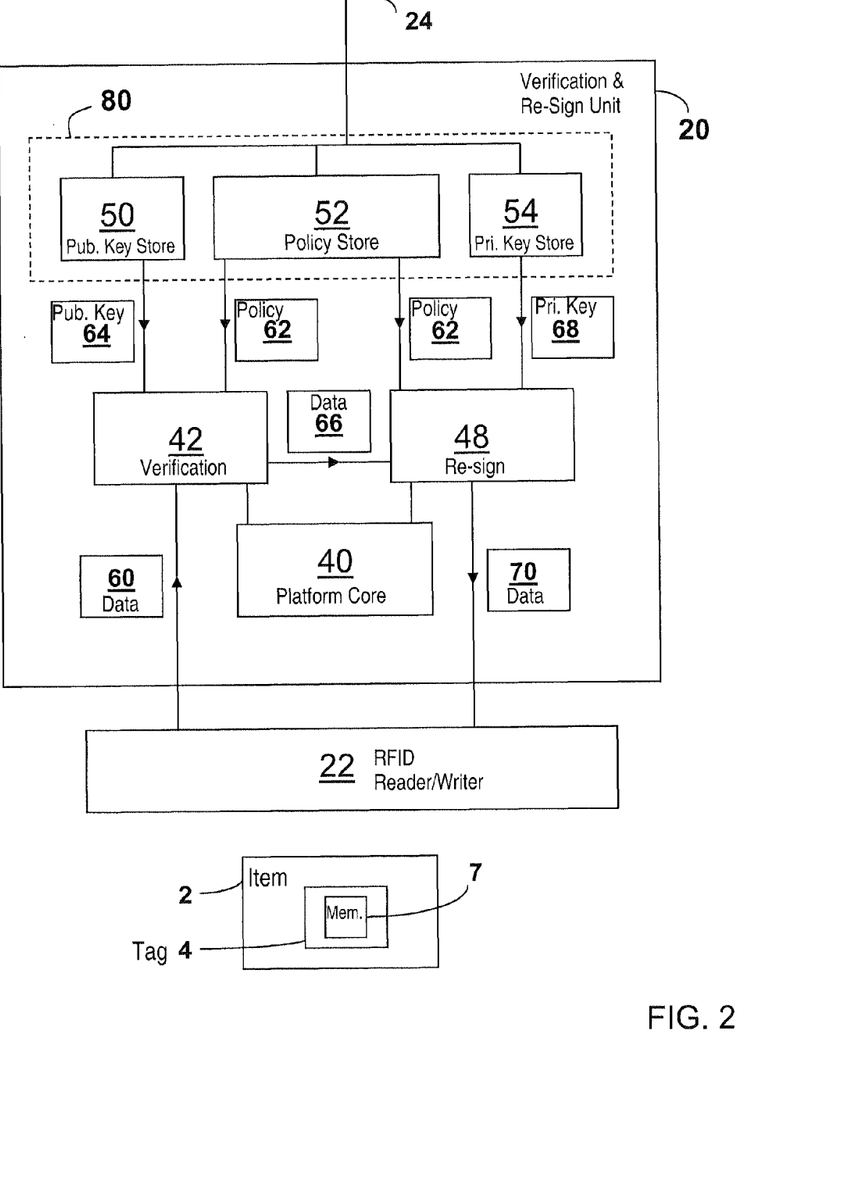
FIG. 2 is a schematic illustration in block diagram form showing a verification and re-sign unit, and a reader-writer, of the system of FIG. 1.

FIG. 2 is a schematic illustration in block diagram form showing in more detail, by way of example, the second verification and re-sign unit 20 and the second reader-writer 22. In this embodiment, each verification and re-sign unit 10, 20 and 30 is essentially the same, and hence the following description applies to the first and third units also. Hence, for convenience, in the following description of FIG. 2, the second verification and re-sign unit 20 and the second RFID reader-writer 22 are referred to more simply as verification and re-sign unit 20 and RFID reader-writer 22.

The verification and re-sign unit 20 comprises conventional computing and processing hardware and software, including storage media arranged to provide functional modules, functional stores, and functional connections:

In more detail, the verification and re-sign unit 20 comprises a platform core module 40, a verification module 42, and a re-sign module 48. The verification and re-sign unit 20 further comprises a public key store 50, a policy store 52, and a private key store 54. The verification and re-sign unit 20 further comprises a sealed storage 80. The public key store 50, the policy store 52, and the private key store 54 are each provided by, i.e. located in, the sealed storage 80.

The above modules and stores are coupled as follows. The platform core module 40 is coupled to the verification module 42 and the re-sign module 48. The verification module 42 is further coupled to the public key store 50, to the policy store 52, to the re-sign module 48, and to the RFID reader-writer 22. The re-sign module 48 is further coupled to the policy store 52, to the private key store 54, and to the RFID reader-writer 22. The public key store 50, the policy store 52 and the private key store 54 are each coupled via the communications link 24 to the supply chain controller 6 (as mentioned above, this coupling to the supply chain controller need not be continually available for typical ongoing operation of the system 1).

FIG. 2 also shows schematically data that is passed between the above described elements during operation of the verification and re-sign unit 20, as follows. Read-out data 60 is passed from the RFID reader-writer 22 to the verification module 42. A public key 64 is passed from the public key store 50 to the verification module 42. A policy 62 is passed from the policy store 52 to the verification module 42, and also to the re-sign module 48. Verification outcome data 66 is passed from the verification module 42 to the re-sign module 48. A private key 68 is passed from the private key store 54 to the re-sign module 48. Write data 70 is passed form the re-sign module 48 to the RFID reader-writer 22.

Further referring to FIG. 2, the RFID tag 4 of the item 2 comprises a tag memory 7, which is explained in more detail below with reference to FIG. 3.

Figure 3:
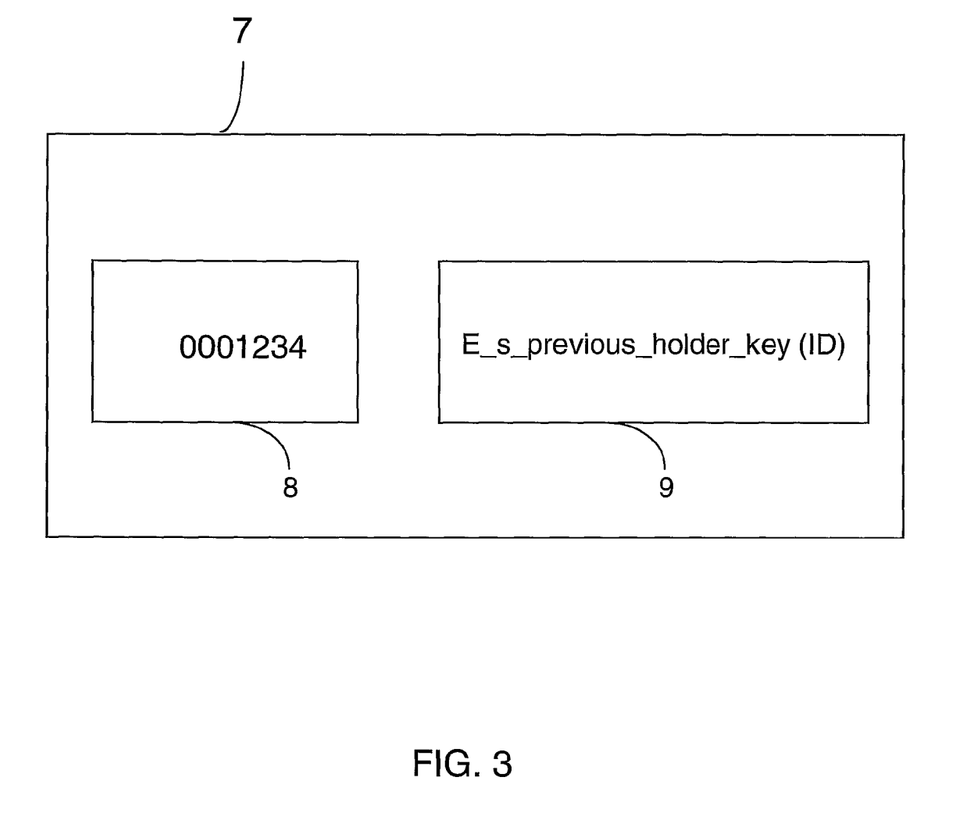
FIG. 3 is a schematic representation of a tag memory 7 of an RFID tag 4.

FIG. 3 is a schematic representation of the tag memory 7 of the RFID tag 4. The tag memory comprises a tag identifier 8 and a signature 9. In the example shown in FIG. 3, the tag identifier has value 0001234, and the signature 9 is shown represented as "E_s_previous_holder_key (ID)".

Figure 4:
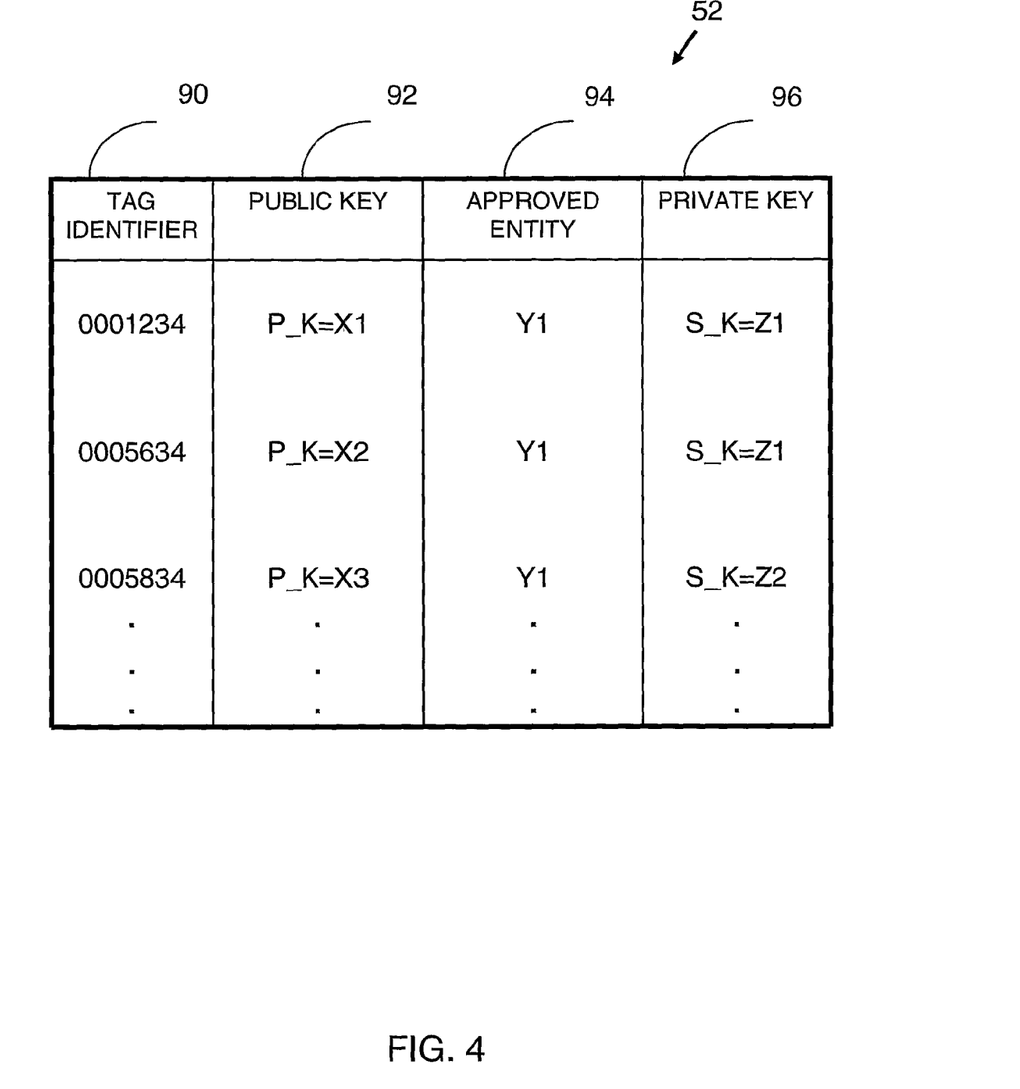
FIG. 4 is a schematic representation of contents of a policy store of the verification and re-sign unit of FIG. 2.

FIG. 4 is a schematic representation of contents of the policy store 52. A policy comprises various entries of values or instructions for different respective values of tag identifier 8. In this example the entries are "public key", "approved entity" and "private key". In this example the policy store 52 stores the policy data in the form of a look-up table, which therefore in this example has the following columns: tag identifier column 90, public key column 92, approved entity column 94, and private key column 96. The public key column 92 and the private key column 96 comprise indications of appropriate key to be used, however the actual keys are stored in the separate public key store 50 and private key store 54 respectively.

Figure 5:
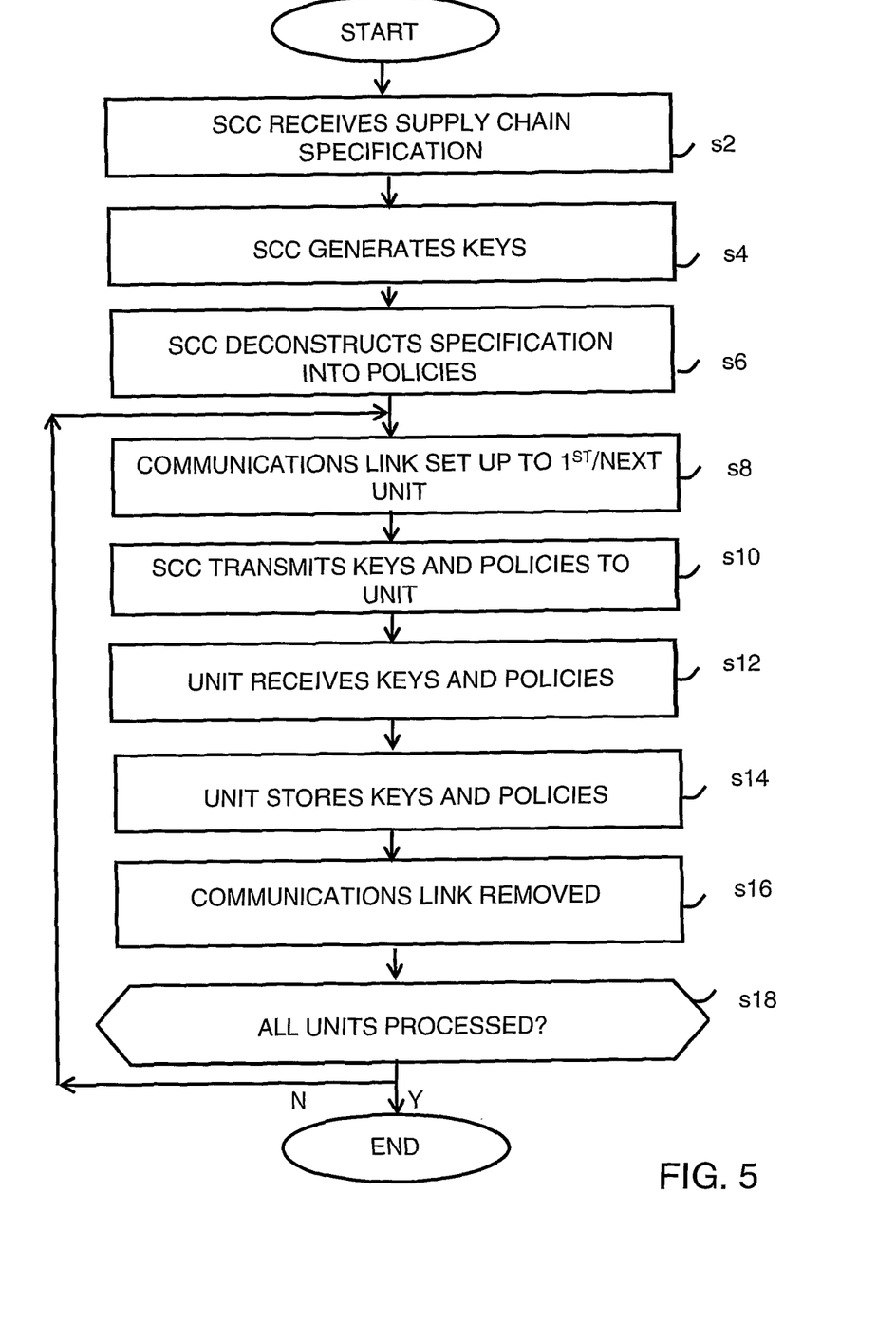
FIG. 5 is a flowchart showing process steps carried out by various elements of the supply chain verification system of FIG. 1 in a set-up procedure.

FIG. 5 is a flowchart showing process steps carried out by various elements of the supply chain verification system 1 in a set-up procedure that may be employed with this embodiment.

At step s2, the supply chain controller 6 receives a supply chain specification. This may specify, for example, authorised supply routes in terms of tag identifier value of RFID tags, e.g. in ranges of values, and then details of which entities are authorised to pass these tags (and hence the items these tags are attached to) to which other different entities along a supply chain.

At step s4, the supply chain controller 6 generates keys, more particularly public keys 64 and private keys 68.

At step s6, the supply chain controller 6 decomposes the supply chain specification into entity-specific policies, such as described above in relation to FIG. 4.

At step s8, a communications link is set up from the supply chain controller 6 to a first one of the entities in the supply chain. For ease of description, we will assume in this example the supply chain controller 6 first sets up the first communication link 14 to the first verification and re-sign unit 10 of the first entity, however in other examples this setting-up of the different communication links to the different entities (i.e. their verification and re-sign units) can be done in any order.

At step s10 the supply chain controller 6 transmits the policies, and public and private keys, over the first communications link 14 to the first verification and re-sign unit 10.

At step s12, the first verification and re-sign unit 10 receives the policies and keys.

At step s14, the first verification and re-sign unit 10 stores the received policies and keys i.e. stores the received policies in its policy store 52, stores the received public keys in its public key store 50, and stores the received private keys in its private key store 54.

At step s16, the communications link 14 is removed, although in other examples the link may be retained for convenience.

At step s18 the supply chain controller 6 determines whether all the verification and re-sign units of the present supply chain specification have been processed. In this example, they have not, so the process returns to step s8.

At step s8, a communications link is set up from the supply chain controller 6 to a next one of the entities in the supply chain; in this example the third communications link 34 is set up to the third verification and re-sign unit 30 (i.e. in this set-up process the "next" unit to be processed need not be the next one in the sense of the supply chain flow). Thereafter steps s10 to s16 as described above are accordingly repeated for the third verification and re-sign unit 30, with policies and keys appropriate to this unit 30 being sent to it, and so on.

At step s18 the supply chain controller 6 determines whether all the verification and re-sign units of the present supply chain specification have been processed. In this example, again, they have not, so the process returns to step s8.

At step s8, a communications link is set up from the supply chain controller 6 to a next one of the entities in the supply chain; i.e. the second communications link 24 is set up to the second verification and re-sign unit 20. Thereafter steps s10 to s16 as described above are accordingly repeated for the second verification and re-sign unit 20, with policies and keys appropriate to this unit 20 being sent to it, and so on.

This time at step s18, the supply chain controller 6 determines that all the verification and re-sign units of the present supply chain specification have been processed, and hence the set-up process is completed.

Operation of the supply chain verification system 1 will now be described below with reference to FIGS. 6 and 7. This process assumes that a set-up process, for example such as that described above with reference to FIG. 5, has been performed. Any appropriate set-up process may have been employed.

Figure 6:
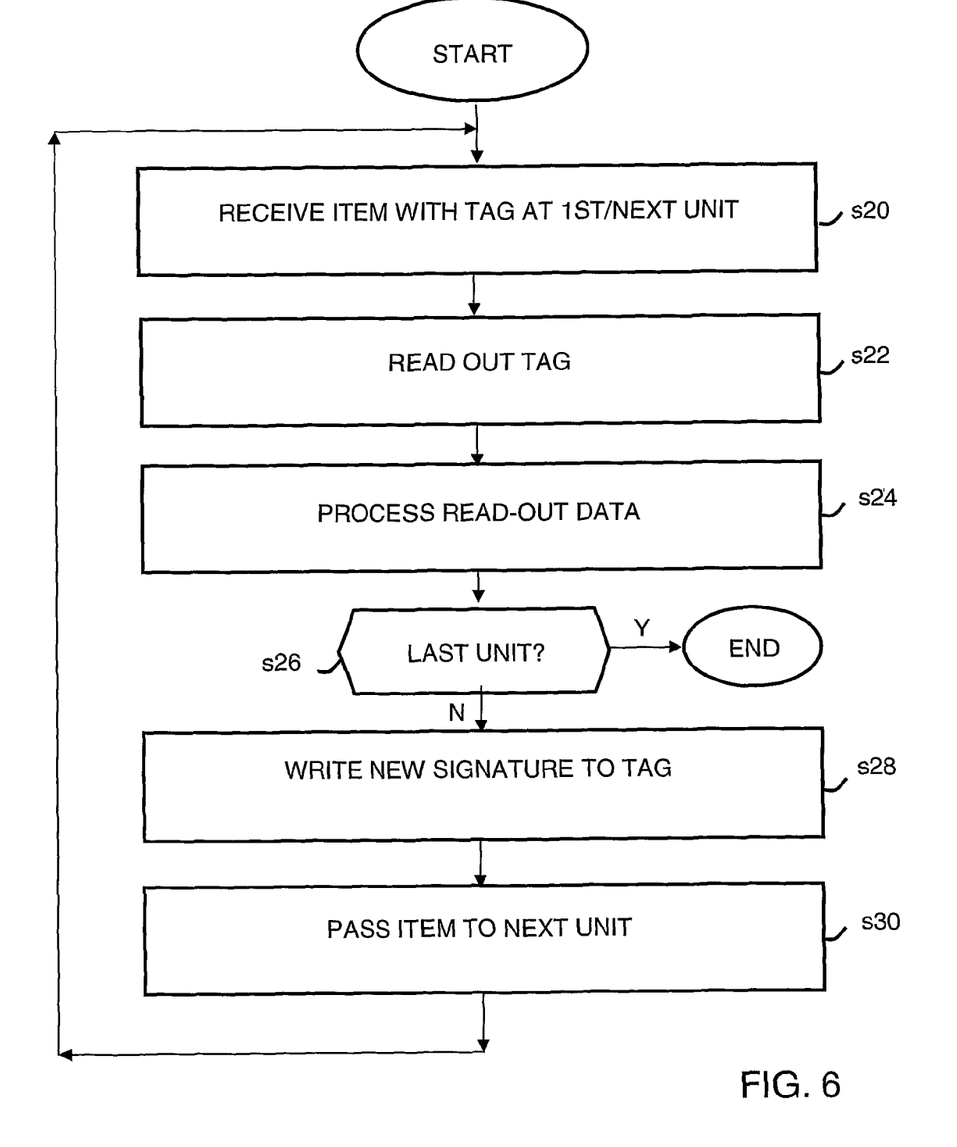
FIG. 6 is a process flowchart showing process steps carried out in an embodiment of a supply chain verification process.

FIG. 6 is a process flowchart showing process steps carried out in this supply chain verification process. This process will be described in terms of a verification and re-sign unit that is neither the first unit, nor the last unit, of the authorised supply chain of units in terms of the flow of the authorised chain. Thus in this example, the process will be described in terms of the second verification and re-sign unit 20, at the second entity.

At step s20, the second verification and re-sign unit 20 of the authorised supply chain receives the item 2 which has previously been processed by the first verification and re-sign unit 10. As described above, the RFID tag 4, comprising the tag memory 7, is attached to the item 2.

At step s22, the second RFID reader-writer 22 reads out the information contained on the RFID tag 4; in more detail the second RFID reader-writer 22 reads out the information in the tag memory 7 thereby providing read-out data 60 as shown in FIG. 2. As explained above, the tag memory 7 comprises a tag identifier 8, e.g. an identifying number, and a signature 9. The signature is an encrypted signature provided by the previous verification and re-sign unit of the supply chain, i.e. the last unit that has processed the RFID tag 2, which in this example was the first verification and re-sign unit 10 which previously processed the tag at the first entity.

At step s24, the second verification and re-sign unit 20 processes the read-out data 60. This processing step verifies that the second verification and re-sign unit 20 is authorised to receive the specific identified tag from the first entity and further provides new write data 70 (shown in FIG. 2) to be written in to the tag memory 7 of the RFID tag 4. The new write data 70 comprises a new signature 9 which is an encrypted signature of the second verification and re-sign unit 20. Further details of this processing step s24 are described below with reference to FIG. 7.

At step s26, the second verification and re-sign unit 20 determines whether it is the last unit of the authorised supply chain. If it were the last unit of the supply chain, then the present process would be ended. In particular, assuming the result of verifying that the second verification and re-sign unit 20 is authorised to receive the specific identified tag from the first entity was positive, then this would be the final verification stage of the supply chain as a whole. Note, in this case, it would not be necessary to produce the new write data 70 mentioned above. Also, other optional actions could then be taken afterwards, if desired, as will be discussed later below. However, in this example the second verification and re-sign unit 20 is not the last unit of the authorised supply chain, hence the above mentioned write data 70 is produced and the process moves to step s28.

At step s28, the newly provided write data 70, in particular the encrypted signature of the second verification and re-sign unit 20, is written to the tag memory 7 of the RFID tag 4; in more detail the newly provided write data 70 is received by the second RFID reader-writer 22 which writes the data to the signature 9 field of the tag memory 7.

At step s30, the item 2 with RFID tag 4 attached thereto is passed to the next verification and re-sign unit 20 of the authorised supply chain, i.e. the third verification and re-sign unit 30. The process then in effect returns to step s20, where the next verification and re-sign unit, in this case the third verification and re-sign unit, receives the item 2 and then implements steps 22-30 as described above, until the unit in question fulfils the criteria at the decision stage of step s26 of being the last unit in the supply chain (as indeed is the case for the third verification and re-sign unit 30 in this example).

Further details of the above mentioned processing step s24 will now be described with reference to the process flowchart of FIG. 7, which shows process steps s40-s64 providing in combination processing step s24.

At step s40, the second verification and re-sign unit 20, more particularly the verification module 42, receives the read-out data 60 from the second RFID reader-writer 22. As described above, the read-out data contains the tag identifier 8 and the current encrypted signature 9.

At step s42, the verification module 42 ascertains the identity of the tag from the tag identifier 8 information part of the read-out data 60.

At step s44, the verification module 42 extracts, from the policy store 52, the policy 62 that corresponds to ascertained tag identity.

At step s46, the verification module 42 ascertains from the extracted policy 62, for example by interrogating or querying the extracted policy 62, the identity of the public key that is to be used to decipher the current encrypted signature 9.

At step s48, the verification module 42 extracts the identified public key 64 from the public key store 50.

At step s50, the verification module 42 deciphers the encrypted signature 9 using the extracted public key 64.

At step s52, the verification module 42 verifies that the deciphered signature corresponds to an entity (i.e. verification and re-sign unit) that the second entity (i.e. the second verification and re-sign unit 20) is authorised under the policy 62 to receive the specific identified RFID tag 4 from. This is performed, for example, by accessing the "approved entity" entry (as previously stored in column 94 of the policy store 52) of the extracted policy 62.

When verification has been successful, at step s54, the verification module 42 forwards the verification outcome 66 (i.e. approval) and indication of the tag identity to the re-sign module 48.

At step s56, the re-sign module 48 extracts, from the policy store 52, the policy 62 that corresponds to ascertained tag identity. (Alternatively, the policy 62 can be forwarded by the verification module.)

At step s58, the re-sign module 48 ascertains from the extracted policy 62, for example by interrogating or querying the extracted policy 62, the identity of the private key that is to be used to encipher the new encrypted signature 9.

At step s60, the re-sign module 48 extracts the identified private key 68 from the private key store 54.

At step s62, the re-sign module 48 creates a new encrypted signature 9 corresponding to its own identity (i.e. the second verification and re-sign unit 20) and encrypted using the extracted private key 68.

At step s64, the re-sign module 48 outputs or provides the new encrypted signature 9, in this example by forwarding the new encrypted signature 9 in the form of write data 70 to the second RFID reader-writer 22.

By virtue of the above described steps s40-s64, processing step s24 of FIG. 6 is implemented.

In the above description of the supply chain verification process, the description has concentrated primarily on operation of the second verification and re-sign unit 20 as this unit is neither the first unit, nor the last unit, of the authorised supply chain of units in terms of the flow of the authorised chain. Thus the second verification and re-sign unit 20 (and its associated second RFID reader-writer 22) carries out a first aspect of reading and verification to verify the previous "upstream" entity as well as a second aspect of writing of the new encrypted signature to provide data that can be verified by the next "downstream" entity. However, as mentioned in passing above, the verification and re-sign units at the start and the end of the supply chain do not need to implement both aspects, and hence need not comprise all the elements described above. In other words, the first verification and re-sign unit 10, being at the entity that is at the start of the supply chain, does not need to carry out the first aspect of reading and verification, as there is no previous "upstream" entity to verify. Hence the first verification and re-sign unit 10 does not need to contain, for example, a verification module or a public key store. Furthermore, the verification and re-sign unit 10 can be used in conjunction with just a RFID writer rather than an RFID reader-writer. Similarly, the third verification and re-sign unit 30, being at the entity that is at the end of the supply chain, does not need to carry out the second aspect writing and encrypting a new signature, as there is no next "upstream" entity to provide data to for verification. Hence the third verification and re-sign unit 30 does not need to contain, for example, a re-sign module or a private key store. Furthermore, the verification and re-sign unit 30 can be used in conjunction with just a RFID reader rather than an RFID reader-writer. In either case, it may nevertheless be convenient to use a unit that provides both functions, so that a common unit can be provided, and also as there may be occasions where any given entity lies at different positions within different authorised supply chains.

Figure 7:
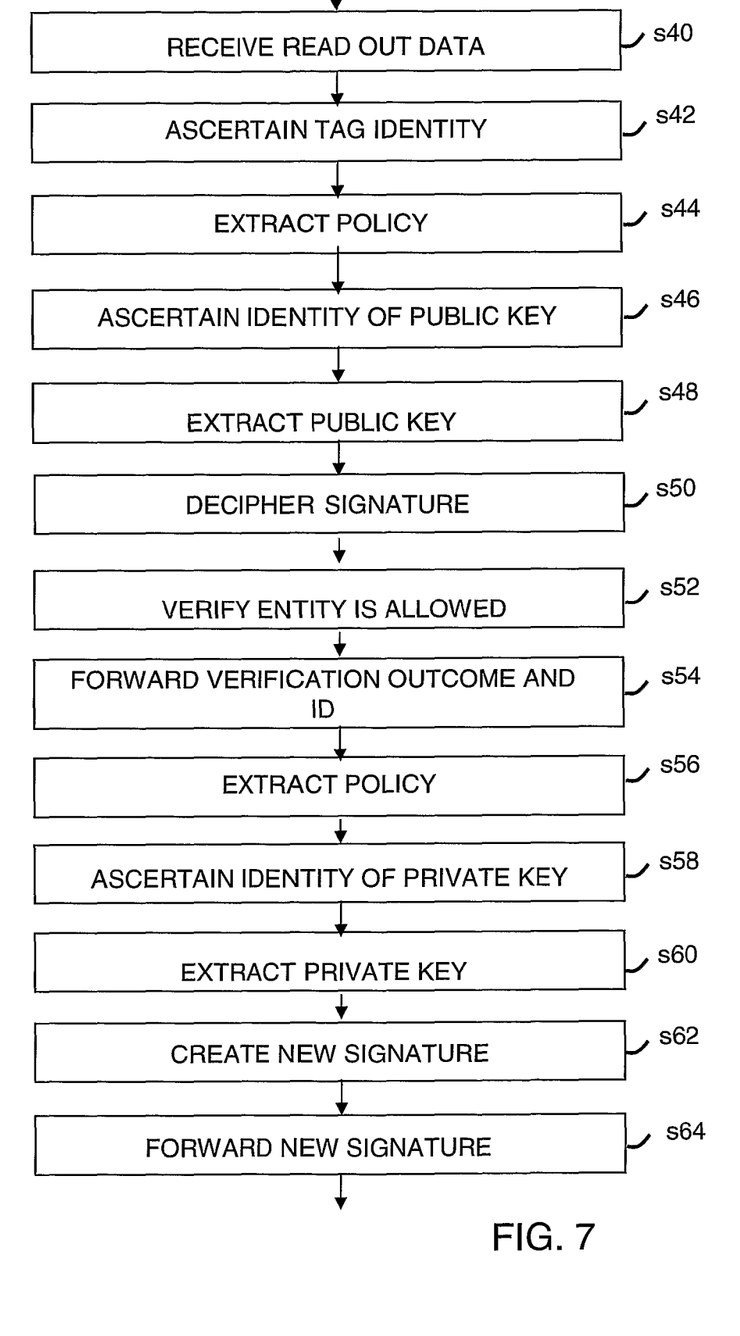
FIG. 7 is a process flowchart showing process steps which in combination provide one of the processing steps of the process of FIG. 6.

It should be noted that certain of the process steps depicted in the flowcharts of FIGS. 5, 6 and 7 and described above may be omitted or such process steps may be performed in differing order to that presented above and shown in FIGS. 5, 6 and 7. Furthermore, although all the process steps have, for convenience and ease of understanding, been depicted as discrete temporally-sequential steps, nevertheless some of the process steps may in fact be performed simultaneously or at least overlapping to some extent temporally.

In this embodiment, the public and private key encrypting and deciphering, and form of the signature 9, is implemented as per the well known RSA algorithm, further details of which may be found in R. Rivest, A. Shamir, L. Adleman, "A Method for Obtaining Digital Signatures and Public-Key Cryptosystems", Communications of the ACM, Vol. 21 (2), pp. 120-126, 1978. However, in other embodiments, other public/private key algorithms or protocols can be used.

By virtue of the elements and processes described above, a system and process is provided by virtue of which a downstream entity can verify that an item has arrived along an authorised upstream path. Additionally, further details will now be described by virtue of which confidentiality aspects can be preserved since restrictions are provided as to what information the receiving entity is able to learn. Also, the following further details tend to prevent an authorised receiving entity from maliciously introducing e.g. counterfeit items into the supply chain, for example by misusing one or more of the private keys issued to it.

As mentioned earlier, the public key store 50, the policy store 52, and the private key store 54 are located in the sealed storage 80 which is part of the earlier mentioned storage media.

Furthermore, the computing and processing hardware and software, including storage media (including the sealed storage 80) arranged to provide the above described functional modules, functional stores, and functional connections, of the verification and re-sign unit 20, includes a Trusted Platform Module (TPM) chip. The TPM contains information required to permit the verification and re-sign unit 20 to perform the above described process of creating a new encrypted signature (i.e. to prove to the next entity downstream that the item, and its supply, is authentic). TPMs are tamper-resistant and encompass various different security functionalities. TPM chips are commercially available, and are currently used for example in personal computers. The verification and re-sign unit 20 may be built on top of a TPM-aware Linux (registered trademark) kernel, such as Enforcer (registered trademark) or on top of IBM Trusted Computing Linux (registered trademark). Software for supporting the TPM is available as open source release and hence may be readily accessed by the skilled person, or new software written as desired.

Two main functions of the TPM module are used: remote attestation and sealed storage, i.e. the sealed storage 80.

Remote attestation allows a remote party to verify that the verification and re-sign unit 20 is running with a correct software stack. The remote attestation is implemented by instructing the TPM to generate a certificate stating what software is currently running on the verification and re-sign unit 20. The verification and re-sign unit 20 can then present this certificate to a remote party to show that the software has not been modified. In this embodiment the supply chain controller 6 only sends policies and private keys to verification and re-sign units that run the correct re-signing software. The supply chain controller 6 can also perform random audit operations to ensure that the verification and re-sign unit 20 is operating correctly and has not been compromised.

The sealed storage 80 enables the protection of private information stored in the verification and re-sign unit 20. The private information is encrypted using a key that is unique to the software and hardware being used. This means that the data can only be read by the same combination of software and hardware. For example, the policies and private keys sent from the supply chain controller 6 to the verification and re-sign unit 20 can only be accessed when the verification and re-sign unit 20 is using the correctly authorised software application. The TPM functionalities running on the verification and re-sign unit 20 prevent a malicious application locating the private key, reading it and sending to an unauthorised entity. In our case we assume that the verification and re-sign unit 20 is required to employ a specified configuration comprising a specific operating system and specified software that implements the verification module 42 and the re-sign module 48. Then, if the configuration unexpectedly changes, for example if it has been compromised by an adversary (perhaps with the purpose of injecting counterfeited products into the supply chain), the TPM will deny access to the key and hence prevent the re-signing operation.

Further implementation details related to the TPM are as follows. A main feature of the platform core module 40 is the operating system. The operating system is required to interface with the TPM. Further well known elements, e.g. a BIOS (Basic Input/Output System) and a boot-loader, are configured to be TPM aware to ensure the integrity of the operating system.

In general, according to this embodiment the verification and re-sign unit 20 can effectively act as a secure proxy for the supply chain controller 6.

As a further possibility when implementing this embodiment, multiple entities, e.g. multiple service providers can use a given trusted verification and re-sign unit to perform their own supply chain validation checks.

Alternatively or additionally, a given chain entity dealing with several "upstream" entities may allow each upstream entity to install its own keys and policies onto the trusted verification and re-sign unit of the given entity. Thereafter, one or more of the upstream entities can remotely interrogate the attestation functionality of the TPM of the trusted verification and re-sign unit of the given entity.

Furthermore, a given supply chain entity dealing with several upstream entities may install its own keys and policies onto the trusted verification and re-sign unit of the upstream entity. In other words, a peer-wise trusted supply chain may be formed in either direction.

In this embodiment, the public key store, the policy store and the private key store are each located in the sealed storage 80. In other embodiments, however, other configurations are possible. For example, in one configuration only the private key store is located in sealed storage. This can reduce the amount of sealed storage required but still ensures that at least the private key is secure.

In the above described embodiment, the various processes described above are implemented by modules configured as described. In other embodiments, however, the various functions can be provided in differing module arrangements, as required.

Furthermore, some or all of the functional modules described above may be implemented in distributed equipment, using directly connected connections or coupled via networks. However, it is preferred to locate the modules in specific apparatus as described above as this provides advantages such as reduced processing time, and in particular improved localised robustness and continuity of service, while retaining security and control.

In the above described embodiments, the separate processes of reading and writing the RFID tag are carried out by a single combined RFID reader-writer device. In other embodiments, instead of a combined reader-writer device, separate RFID reader and RFID writer devices may be used.

Also, in addition to the data read out and written as per the above described processes for the purpose of authorised route verification, the RFID reader-writer (whether a combined device or separate read and write devices) may also be used for additional, conventionally known, item movement and storage control functions. In such instances, the RFID tag memory will comprise additional fields as required.

A further possibility is that the RFID reader-writer may be integrated in the verification and re-sign unit. This would provide the possibility for further security to be provided to protect the integrity of the verification and re-sign process, particularly when applied to the above described second main embodiment.

In the above described embodiments the authorised supply chain is simple, comprising only three entities and further comprising only one authorised route between the three entities. However, the present invention may be applied to larger and/or more complicated supply routes between entities. For example, there may be more than three entities. Also, there may be more than one authorised route through a number of entities, i.e. a given entity may be authorised to receive a specific tag identity from more than one upstream entity, and/or there may be more than one downstream entity for which a given entity is authorised to forward a specific tag identity to.

Another possibility is that not every entity of e.g. a supply chain is required to carry out the above described verification and re-signing process, i.e. only specific entities may be required to carry out the processes.

In the above embodiments, the authorised supply route, and provision of the various policies and keys, is centrally controlled by the supply chain controller. However, in other embodiments, some or all of these functions can be implemented on a peer-to peer, i.e. entity-to-entity basis. For example, according to one possibility, entities which are authorised to pass an item between them (at least in one direction) are partnered. Exchange of key information takes place to allow the downstream partner to check that a received item has arrived from an expected upstream partner. Each supply chain partner acts as a local service provider to configure only the immediate upstream or downstream leg of the supply chain. The upstream partner creates the public-private key pair for use by the downstream partner in re-signing operations. According to a further possibility, the downstream party can provide the private key to the upstream party, although this approach suffers from the aspect that the re-signing operation must know the intended downstream path for the item (and hence which key to use).

In the above described embodiments relatively simple policies are employed, i.e. a policy comprises entries for different respective values of the tag identifier, the entries being public key, approved entity and private key. However, in other embodiments, the policy can contain more features. One general possibility is that the policy specifies additional actions to take place dependent upon the results of the deciphering and verifying steps. For example, a policy can stipulate that if a verification fails, an alarm should be raised, and/or information should automatically be sent to the supply chain controller and/or a separate third party, for example a conventional e-pedigree service. Also, a policy can stipulate, for example, that some or all instances of successful verification should be reported to the supply chain controller and/or a separate third party, for example a conventional e-pedigree service.

Furthermore, any of the above embodiments can be used in conjunction with, or instead of, a conventional e-pedigree process.

By way of example, a scenario in which the present invention may advantageously be implemented will now be described. A pharmaceutical company manufactures a specific drug that is tagged with RFID technology. The manufacturer wishes control the distribution of the drug from the point of production until the retailer (e.g. hospital, pharmacy, local GP, etc.). A goal of the manufacturer is to ensure that the drug is only handled by authorised parties. If any unauthorised party intercepts the supply chain, or if any authorised supplier acts maliciously or even in error, the drugs may be directed towards unauthorised parties. If this happens, then by virtue of implementation of the present invention, the drug will be ultimately be detected as unauthorised.

Further advantages that tend to be provided by at least some aspects of the present invention are as follows.

The verification process is relatively resilient. The process has low vulnerability to single point failure. For example, in most of the above described embodiments, a centralized server, e.g. the supply chain controller, need only be used to set up the verification system, but is not required for ongoing operation of the system.

A low level of information needs to be exchanged between adjacent entities in a supply chain. Moreover, no information needs to be shared between non-adjacent entities.

The above described embodiments can be implemented using standard RFID tag technology. The above described embodiments do not require any additional computational power to be given to a conventional RFID tag, and also do not require any changes to standardised data reading, writing and storing protocols for RFID tags. However, it is also possible to adapt such protocols for use-specific reasons if desired.

Any counterfeit goods injected into a supply chain will lack the required upstream credentials and can be detected quickly by a downstream supply chain entity. Such quick detection can allow more effective action to be taken against counterfeiters.

Since each entity only verifies that items have arrived from an authorised adjacent upstream entity, the approach is highly scalable, both in terms of trace information on the RFID tag, and the number of cryptographic keys that are held for the validation and re-signing processes.

What is claimed is:

1. An apparatus for use in verification of a route taken during movement of an RFID tag, the apparatus comprising:
    a processing system having one or more processors;
    sealed storage comprising a store for storing a private key and a policy; and
    a trusted platform module which is operatively coupled to the sealed storage to protect the private key and policy, and which is operatively coupled to the processing system to:
        (i) use the private key to provide, for the given RFID tag identity, an encrypted signature based on the policy; and
        (ii) forward data comprising the encrypted signature to an RFID tag writer for writing to the RFID tag.

2. The apparatus according to claim 1, further comprising:
    one or more stores for storing a public key; and
    wherein the processing system in operation with the trusted platform module is further arranged to:
        (i) receive, from an RFID tag reader, data read-out from the RFID tag and comprising an RFID tag identity and an encrypted signature;
        (ii) use the public key to decrypt the encrypted signature from the data read-out from the RFID tag; and
        (iii) verify that the decrypted signature corresponds to a first entity from which, according to the policy, a second entity associated with the apparatus is authorised to receive an RFID tag with the given RFID tag identity.

3. The apparatus according to claim 2, wherein the sealed storage further comprises one or more of the stores for storing the public key and the policy.

4. A verification apparatus for use in verification of a route taken during movement of an RFID tag, the verification apparatus comprising:
    a processing system having one or more processors;
    sealed storage comprising one or more stores for storing a public key, a private key and a policy; and
    a trusted platform module which is operatively coupled to the sealed storage to protect the public key, private key and policy, and which is operatively coupled to the processing system to:
        (i) receive, from an RFID tag reader, data read-out from the RFID tag and comprising an RFID tag identity and an encrypted signature;
        (ii) use the public key to decrypt the encrypted signature from the data read-out from the RFID tag; and
        (iii) verify that the decrypted signature corresponds to a first entity from which, according to the policy, a second entity associated with the verification apparatus is authorised to receive an RFID tag with the given RFID tag identity.

5. The verification apparatus according to claim 4, wherein the processing system in operation with trusted platform module is further arranged to:
    (i) use the private key to provide, for the given RFID tag identity, an encrypted signature; and
    (ii) forward data comprising the encrypted signature to an RFID tag writer for writing to the RFID tag.

6. The verification apparatus according to claim 5, wherein the sealed storage further comprises the store for storing a private key.

7. The verification apparatus according to claim 1, wherein the apparatus further comprises the RFID tag reader and the RFID tag writer.

8. The verification apparatus according to claim 1, arranged to allow remote attestation by a third party.

9. The verification apparatus according to claim 1, wherein the processing system in operation with the trusted platform module is further arranged to report the verification to one or more third parties.

10. The verification apparatus according to claim 1, wherein the processing system in operation with the trusted platform module is further arranged to raise an alarm responsive to the verifying step determining that the decrypted signature does not correspond to an entity from which the second entity is authorised to receive an RFID tag with the given RFID tag identity.

11. The verification apparatus according to claim 9, wherein a third party to which verification is reported and a third party by whom remote attestation is allowed are identical.

12. A system for verifying a route taken during movement of an RFID tag, the system comprising:
    the apparatus according to claim 1

13. The system according to claim 12, further comprising one or more further apparatuses.

14. The system according to claim 12, further comprising a controller apparatus operatively coupled to the apparatus.

15. The system according to claim 14, wherein the controller apparatus is arranged to provide one or more of a public key, the private key and the policy to one or more of the apparatuses of the system.

16. The system according to claim 14, wherein the controller apparatus is arranged to perform remote attestation of one or more of the apparatus of the system.

* * * * *